Figure 1:
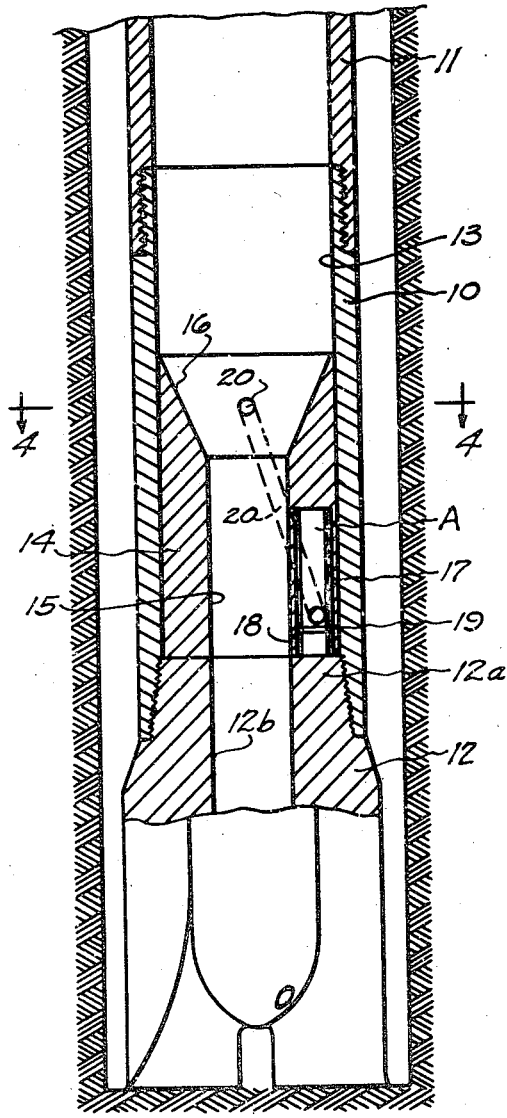

Nov. 1, 1949.  G. JACKSON  2,486,529

INCLINATION INDICATING APPARATUS

Filed Jan. 22, 1945  2 Sheets-Sheet 1

Gordon Jackson
INVENTOR.

BY Joe E. Edwards
ATTORNEY

Nov. 1, 1949.  G. JACKSON  2,486,529
INCLINATION INDICATING APPARATUS
Filed Jan. 22, 1945  2 Sheets-Sheet 2

Gordon Jackson
INVENTOR.

BY Jod E. Edwards
ATTORNEY

Patented Nov. 1, 1949

2,486,529

UNITED STATES PATENT OFFICE 2,486,529

INCLINATION INDICATING APPARATUS

Gordon Jackson, Long Beach, Calif., assignor, by direct and mesne assignments, to Eastman Oil Well Survey Company, Dallas, Tex., and Denver, Colo., a corporation of Delaware Application January 22, 1945, Serial No. 574,017

8 Claims. (Cl. 33—205)

This invention relates to new and useful improvements in inclination indicating apparatus.

One object of the invention is to provide an improved inclination indicating apparatus which is particularly adapted for use in determining the degree of inclination or the deviation from vertical of a well bore.

An important object of the invention is to provide an improved inclination indicating apparatus which is arranged to be mounted within the drill stem and which is controlled in its actuation by the manipulation of the fluid which is normally circulated downwardly through said drill stem, whereby said instrument may be actuated to provide an indication or reading at any desired elevation and at any time that the drill stem is within the bore.

Still another object of the invention is to provide an improved apparatus, of the character described, wherein said apparatus is mounted within the drill pipe or stem and does not interfere with normal drilling operations; said apparatus being constructed so that it may be operated at any desired time, as for example, just prior to removal of the drill stem and bit, whereby an indication can be obtained each time said stem is removed to change bits, or for other reasons, thereby eliminating a special run of the instrument into the bore either on a wire line or on the drill pipe.

A particular object of the invention is to provide an improved pressure actuated instrument for indicating the inclination of a well bore, which instrument is associated with a restriction within the drill stem, whereby the pressure differential created across the restriction when fluid is circulated therethrough may be utilized to control the actuation of the inclination instrument; the arrangement being such that during normal circulation the instrument is in an inactive non-indicating position and moves into an indicating position when the circulation is halted.

Still another object of the invention is to provide an improved inclination indicating instrument which is relatively simple in construction and which is positive in operation, said instrument including means for locking its indicator in an indicating position whereby said instrument may be retrieved from the well bore and its indication read at the surface.

A still further object of the invention is to provide an improved instrument, of the character described, wherein the indicator thereof is locked against movement during circulation of fluid through the drill pipe so as to protect said instrument against undue shock and vibration during the drilling operation; said instrument being released for actuation as soon as circulation is halted.

The construction designed to carry out the invention will be hereinafter described together with other features of the invention.

Figure 5:
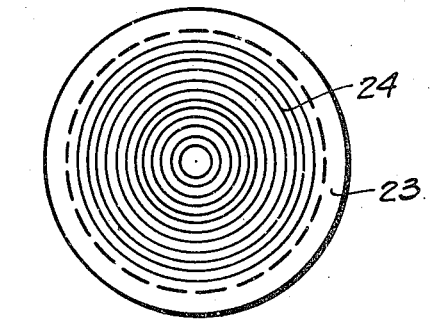
Figure 6:
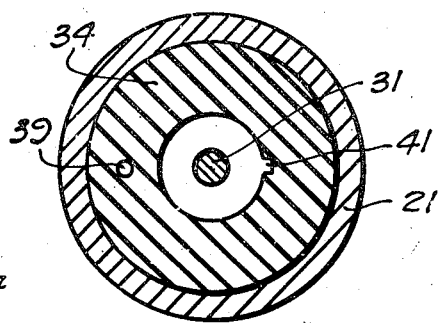
Figure 4:
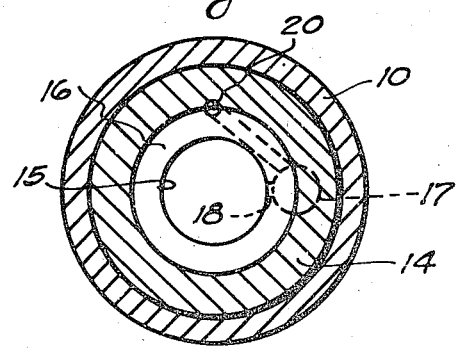
Figure 2:
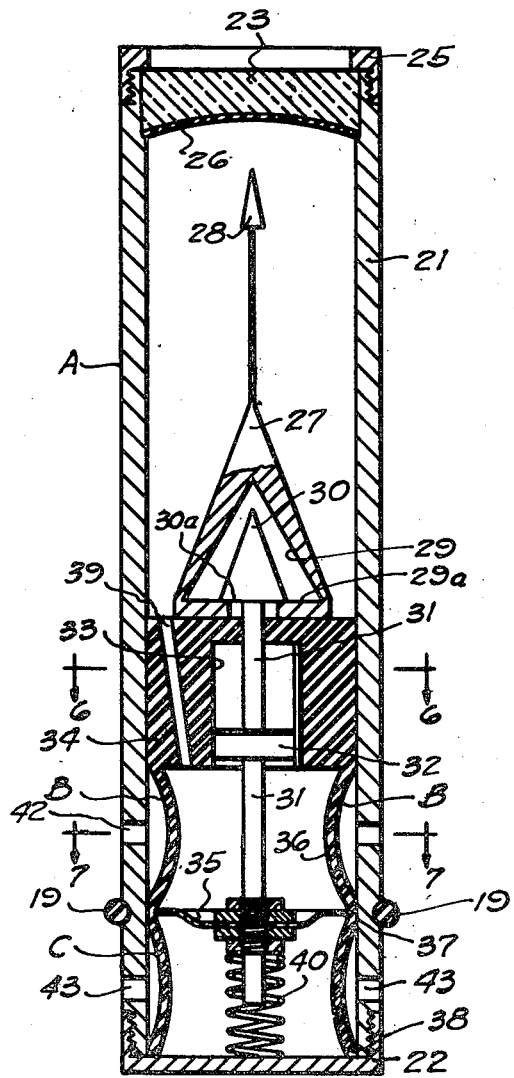
Figure 3:
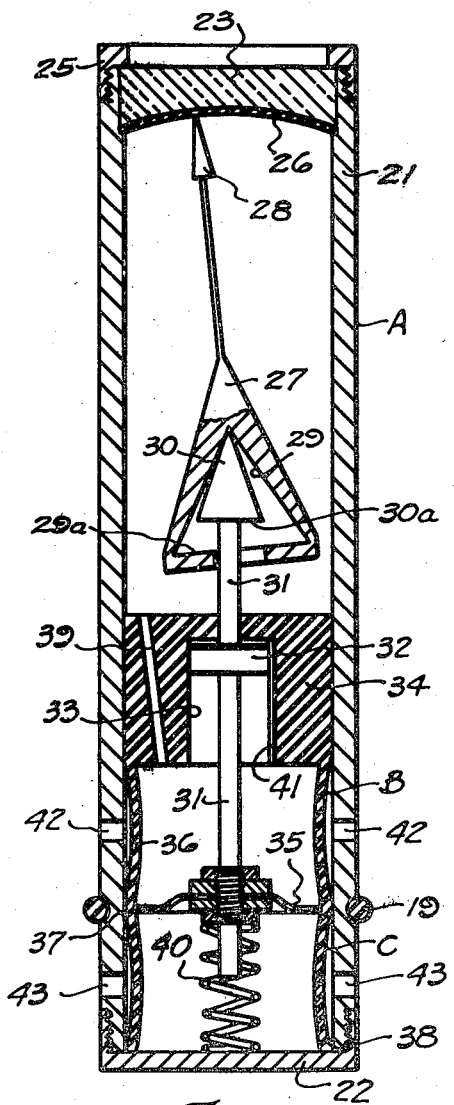
Figure 7:
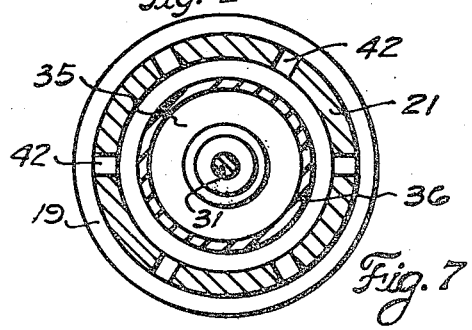

The invention will be more readily understood from a reading of the following specification and by reference to the accompanying drawing, wherein an example of the invention is shown, and wherein:

Figure 1 is a view partly in section and partly in elevation and illustrating an improved inclination indicating apparatus, constructed in accordance with the invention, and mounted within a drill stem, Figure 2 is a enlarged longitudinal sectional view of the inclination indicating instrument and showing the parts in an inactive position, Figure 3 is a view similar to Figure 2 with the indicator of said instrument locked in its indicating position, Figure 4 is a horizontal cross-sectional view taken on the line 4—4 of Figure 2, Figure 5 is a plan view, Figure 6 is an enlarged, horizontal, cross-sectional view taken on the line 6—6 of Figure 2, and Figure 7 is an enlarged, horizontal, cross-sectional view taken on the line 7—7 of Figure 2.

In the drawings the numeral 10 designates a tubular sub which is arranged to be connected to the lower end of a drill pipe or stem 11. The sub is preferably interposed between the lower end of the drill pipe and the usual drill bit 12 and it is desirable that the bore 13 of said sub be of substantially the same diameter as the bore of the drill pipe. An elongate Venturi sleeve or tube 14 is mounted within the sub 10 nad may be pressed or otherwise fastened therein. The lower end of the sleeve abuts the upper end of the shank 12a of the drill bit when the sub is connected to said bit as is clearly shown in Figure 1.

The Venturi sleeve is formed with a longitudinal bore 15 which is of substantially the same diameter as the bore 12b of the shank of the drill bit. The upper end of the bore 15 is flared or inclined outwardly as shown at 16 and the upper end of this flared portion which forms the throat of the venturi is of substantially the same diameter as the bore 13 of the sub 10. With this arrangement it will be apparent that the fluid circulated downwardly through the drill stem will be unrestricted until it enters the flared portion or throat 16 of the Venturi sleeve and this restriction is gradual until the fluid enters the reduced bore 15 of said sleeve and the bore 12b of the drill bit. As is well known the action of the Venturi sleeve will cause a differential of pressure between the fluid entering the flared portion or throat 16 and the fluid flowing through the reduced bore 15, such pressure differential being caused by the restriction formed by the bore 15.

The Venturi sleeve 14 is provided with a longitudinally extending chamber 17 which is formed in the wall of the sleeve and which extends upwardly from the lower end thereof. The chamber 17 is adapted to receive an inclination indicating device A which will be hereinafter described in detail. The extreme lower end of the instrument receiving chamber 17 communicates with the pressure within the restricted bore 15 of the sleeve through a port or ports 18 and thus the lower end of said chamber is subjected to the same pressure as that which is present within the bore 15. A suitable packing ring 19 surrounds the instrument A above the port or ports 18 and seals off the lower portion of the chamber 17. That portion of the chamber 17 above the packing member 19 communicates with the space at the throat or flared portion 16 of the Venturi sleeve through an elongate passage 20. As is clearly shown in Figure 1, the passage 20 extends from the flared throat 16 of the Venturi sleeve and through the wall thereof with its lower end terminating in the instrument receiving chamber 17 above the packing ring 19 on the instrument A. With this arrangement it will be apparent that the lower end of the chamber 17 is exposed or subjected to the pressure in the restricted bore 15, while the upper portion of the chamber is exposed or subjected to the pressure at the Venturi throat through the passage 20. As explained, the pressures at these two points are different with a greater pressure occurring in the passage 20 than that which occurs in the bore 15 and ports 18. This differential in pressure is utilized to effect actuation of the instrument A to provide an indication of the inclination of the well bore at the elevation at which the instrument is located.

The instrument A is clearly shown in Figures 2 to 4 and includes an elongate tubular casing or housing 21 which has its lower end closed by a suitable closure 22 which is threaded onto its lower end. A cover glass or transparent disk 23 which is formed with concentric indicating lines 24 is mounted in the upper end of the casing 21 and is held in position by a flanged retaining ring 25, the latter being threaded onto the upper end of the casing. The cover glass or disk 23 is, of course, clearly transparent and may have its underside provided with a thin coating 26 of transparent rubber or similar frictional material.

A movable plumb bob 27 is mounted within the upper portion of the casing and is formed with an upstanding indicator 28 which is preferably made integral with its upper end. The plumb bob is generally conical in shape and has an internal cavity or recess 29 which is also of a general conical shape with its apex toward the upper end of the plumb bob. A conical pivot support 30 is mounted within the cavity or recess 29 and obviously the plumb bob is suspended on the point of this pivot so as to be freely movable in accordance with the particular inclination of the well bore. It is noted that the pivot is of considerably less size than the area of the recess whereby free movement of the plumb bob on the pivot is possible.

The pivot 30 is attached to the upper end of a piston rod 31 and this rod has a diameter less than the base of the pivot support whereby the bottom 30a of said pivot may engage the internal shoulder 29a which is formed at the base of the recess 29 within the plumb bob 27. The piston rod 31 has a piston 32 secured intermediate its ends and this piston is slidable within a cylinder 33 formed axially within a block or body 34. The block 34 is preferably constructed of hard rubber or similar material and has its outer wall vulcanized or otherwise suitably secured to the inner wall of the casing 21 of the instrument. It will be obvious that when the piston is in its lower position as shown in Figure 2 the base 30a of the pivot support 30 will engage the internal shoulder 29a of the plumb bob 27 to clamp the bottom of the plumb bob against the upper surface of the block 34 and in such position the plumb bob is locked in an inactive nonindicating position. However, as the piston 32 is moved upwardly, the pivot support 30 serves to raise the plumb bob 27 to permit said plumb bob to swing in accordance with the inclination of the instrument and continued upward movement will finally move the indicator 28 at the upper end of the plumb bob into engagement with the underside of the cover glass or disk 23. The provision of the thin layer 26 of the rubber or other material will frictionally lock the indicator more firmly against the bottom of the cover glass so as to prevent accidental movement thereof after an indication has been made.

For actuating the piston 32 in accordance with the pressure differential which is set up in the Venturi throat 16 and the Venturi bore 15, the lower portion of the piston rod 31 has connection with a movable diaphragm 35. The diaphragm extends transversely across the interior of the casing and has its peripheral edge suitably secured to the central portion of a flexible sleeve 36. The sleeve 36 is preferably made integral with the block 34 and its central portion which is at the point that the diaphragm is secured thereto is vulcanized or attached to the inner wall of the casing as indicated at 37. The extreme lower end of the sleeve is also vulcanized or attached at 38 to the casing and in this manner the sleeve 36, in effect provides an upper resilient sleeve section B above the diaphragm and a lower resilient sleeve section C below said diaphragm. If desired, these two flexible sleeve sections could be separate from each other.

The interior of the casing is completely filled with a suitable dampening fluid and communication is established between the plumb bob chamber above the block or body 34 and the diaphragm chamber below the block through a passage 39. The diaphragm 35 and piston rod 31 which is attached to said diaphragm are normally urged toward a raised position by a coil spring 40 which surrounds the extreme lower end of the piston rod below the diaphragm and which is confined between the underside of the diaphragm and the closure 22, whereby the plumb bob 27 and its indicator 28 are normally urged toward a raised or indicating position. Upward movement of the piston 32 within its cylinder is permitted by providing an escape or relief passage or groove 41 which is formed in the wall of the cylinder and obviously as the piston 32 moves upwardly any fluid or pressure thereabove may escape through this passage or groove. The upper sleeve section B which is that portion above the diaphragm 35 has its outer surface subjected to the pressure in the passage 20 of the Venturi sleeve through radial ports or openings 42 which are formed in the instrument casing adjacent this section. The lower sleeve section C which is that portion below the diaphragm 35 is exposed to the pressure within the bore 15 of the venturi through radial openings or ports 43 which are formed in the instrument casing. The packing ring 19 which surrounds the instrument A when said instrument is within the chamber 17 of the Venturi sleeve 14 is disposed between the ports 42 and 43 whereby the upper sleeve section B and the lower sleeve section C are exposed to and actuated by different pressures.

In the operation of the apparatus the parts are assembled as shown in Figure 1 with the instrument A mounted within the receiving chamber 17 of the Venturi sleeve 14. Prior to the circulation of any fluid through the drill stem 11 and Venturi sleeve 14, the pressures within the throat and bore of said venturi are equalized with the result that the same pressure is acting through the ports 42 and 43 on the two sleeve sections B and C of the instrument. Under such conditions, both sleeve sections are in an expanded or outward position adjacent the wall of the casing and the coil spring 40 has urged the piston 32 upwardly, whereby the plumb bob 27 has moved upwardly into contact with the cover glass or disk as illustrated in Figure 3.

The parts are lowered into the well bore and the drilling operation is begun; at this time drilling fluid is circulated downwardly through the drill stem and such circulation fluid will set up a pressure differential across the Venturi sleeve, whereby the pressure which is present within the passage 20 will be greater than that present in the bore 15 and port 18. This differential in pressures will cause the upper sleeve section B of the instrument to be deformed inwardly further than the section C is moved inwardly, as illustrated in Figure 2. This deforming of the section B inwardly a greater distance than any deforming of the lower section C will result in applying a fluid pressure to the upper surface of the diaphragm 35, whereby said diaphragm is moved downwardly against the tension of the spring 40. Downward movement of the diaphragm will cause a lowering of the piston 32 and a resulting lowering of the pivot support 30, whereby the base of said support will engage the internal shoulder 29a of the plumb bob to lock said plumb bob firmly in position against the upper end of the block 34. In such position the plumb bob is inactive and will remain so as long as the drilling fluid is circulated through the drill stem and bit in the usual manner during drilling operations.

When it is necessary to change the drill bit and withdraw the drill pipe or if it is desired to take an inclination reading, the fluid circulation through the drill stem is halted and when this occurs the pressures across the Venturi tube are equalized. This results in an equal pressure being applied to the upper sleeve section B and the lower sleeve section C, whereby pressures across the diaphragm 35 are equalized to allow the spring 40 to move the piston 32 upwardly. As the piston and its rod moves upwardly the pivot support 30 is raised and the plumb bob 27 is released from its locked position. Because the entire casing is filled with a dampening fluid it will be evident that the upward movement of the plumb bob will be relatively slow and therefore the plumb bob 27 may assume an inclined position with respect to the instrument casing, such inclination being in accordance with the degree of inclination of said casing. By the time the plumb bob moves to its uppermost position it has assumed a settled condition and the indicator 28 is engaged with the underside of the cover glass or disk 23. The coil spring 40 will maintain the indicator in frictional engagement with the cover glass and thus said indicator is locked in its indicating position. The entire drill stem is then removed from the well bore and by detaching the drill bit the instrument may be removed from its chamber 17 and the indication given thereby may be read. It is obvious that the record obtained will be permanently maintained by the instrument until such time as the instrument is again used. It is noted that although the transparent cover glass makes it possible to read the instrument without removing the disk 23, said disk could be of the usual soft marking material, such as lead, in which event removal of the retaining collar 25 and disk would be necessary to read the record made thereon by the indicator 28.

It is apparent that the apparatus is relatively simple in construction and is actuated to give the indication by proper manipulation of the circulating fluid. Under normal conditions with the fluid circulating through the drill stem the plumb bob is locked against any movement and is thereby protected against undue shock while the drilling operation is being carried out. Halting of the circulating fluid permits the plumb bob to be released and to move into an indicating position. It is apparent that the device has a distinct advantage in allowing an indication to be made each time that the drill must be changed or replaced and in this way a special run either on a wire line or on the drill pipe is not necessary. The use of the instrument makes is possible to keep an accurate check on the deviation of the well bore during the actual drilling procedure.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The combination with a drill stem, of an inclination indicating apparatus for indicating the inclination of a well bore through which the drill stem extends, said apparatus including, an inclination indicating instrument having means for indicating deviation from the vertical, means within said instrument for operating the indicating means, said instrument also having pressure actuated means for preventing actuation of said instrument, and means for exposing the pressure actuated means of said instrument to the pressure of the fluid which normally circulates through the drill stem, whereby said instrument cannot operate so long as fluid is circulating through the stem and is released to permit actuation of the operating means when said circulation is halted.

2. The combination with a drill pipe through which a drilling fluid may be circulated, an inclination indicating instrument mounted within said stem and including means therein for operating the inclination indicator of the instrument to normally indicate deviation from the vertical, and means for utilizing the pressure of the drilling fluid to prevent normal actuation of said instrument, whereby the latter is inactive as long as fluid is circulated through the stem and is released for actuation by said operating means when said circulation is halted.

3. As a sub-combination in an inclination indicating apparatus, a Venturi tube adapted to be mounted in a drill stem and having an instrument-receiving chamber, and means for establishing communication between the upper and lower portions of the Venturi tube and spaced points within the chamber.

4. The combination with a drill pipe, of an inclination indicating apparatus including, a Venturi sleeve mounted wthin said pipe, an inclination indicating instrument also mounted within said pipe and having means actuated by a pressure differential for rendering the instrument inactive, and means for conducting the pressure from the upper and lower ends of the Venturi sleeve to the pressure-actuated means of the instrument for operating said means to prevent actuation of said instrument so long as fluid is circulated through the Venturi sleeve, halting of the circulation releasing said instrument for actuation.

5. As a sub-combination in an inclination indicating apparatus, a Venturi tube having a longitudinal bore therethrough and adapted to be mounted in a drill stem, the wall of said tube having an instrument receiving chamber, said tube having a communicating opening extending from the upper portion of the bore thereof to a point in the instrument-receiving chamber and having a second communicating passage extending from the lower portion of the bore of said tube to another point in said chamber.

6. The combination as set forth in claim 2, wherein the inclination indicating instrument includes a gravity responsive indicating element, together with means for locking said element in its non-indicating position and against any movement when the pressure actuating means is holding said instrument inactive, whereby damage to said element due to excessive vibration and shock is obviated.

7. The combination with a drill pipe, of an inclination indicating apparatus adapted to be mounted within said pipe and including, an inclination indicating instrument having an inclination indicator for indicating deviation from the vertical, pressure-actuated means within the instrument adapted to have opposite sides acted upon by pressure and connected with the indicator, said pressure-actuated means normally holding the indicator in a non-indicating position when pressures acting on opposite sides thereof are unbalanced and functioning to release the indicator for operation when pressure thereacross are equalized, means within the drill pipe for setting up a pressure differential at two spaced points within said drill pipe when a fluid is circulated therethrough, and means for conducting the pressures at said two points to opposite sides of the pressure-actuated means to hold the inclination indicator against actuation so long as fluid is circulated through the pipe and the pressure differential is maintained at said spaced points, said means for setting up the pressure differential at two spaced points in the drill pipe comprising a Venturi tube mounted in the pipe and said means for conducting the pressures to opposite sides of the pressure-actuated means comprising passages extending from the upper and lower ends of the Venturi tube.

8. An inclination indicating device including, a casing having one end closed by a transparent cover disk, a gravity responsive member movable longitudinally of the casing and having an indicator which is adapted to move into frictional engagement with the cover disk, said indicator engaging the disk in accordance with the position of the gravity responsive member, a cylinder within the casing, a piston movable in said cylinder, a piston rod connecting said piston and the gravity responsive member whereby movement of the piston imparts movement to said member, resilient means for urging the piston longitudinally to move the indicator into engagement with the cover disk, pressure actuated means within the casing connected with the piston rod whereby said means may be employed to impart movement to the piston and the parts connected thereto, and means for applying pressure from exteriorly of the casing to opposite sides of the pressure actuated means to move the gravity responsive means and indicator in a direction away from the cover disk to render the device inactive, said pressure-actuated means comprising a flexible diaphragm which extends across the interior of the casing and which has the piston rod secured axially thereof.

GORDON JACKSON.

REFERENCES CITED

The following references are of record in the file of this patent:

UNITED STATES PATENTS

| Number | Name | Date |
|---|---|---|
| 930,158 | Connett | Aug. 3, 1909 |
| 1,803,785 | Abler | May 5, 1931 |
| 1,895,615 | Elliott | Jan. 31, 1933 |
| 1,905,546 | Webster | Apr. 25, 1933 |
| 1,930,832 | Wickersham et al. | Oct. 17, 1933 |
| 2,232,360 | Barnett | Feb. 18, 1941 |